March 18, 1969     T. W. STONE     3,433,990
ELECTRIC MOTOR AND HOUSING THEREFOR
Original Filed Jan. 29, 1965
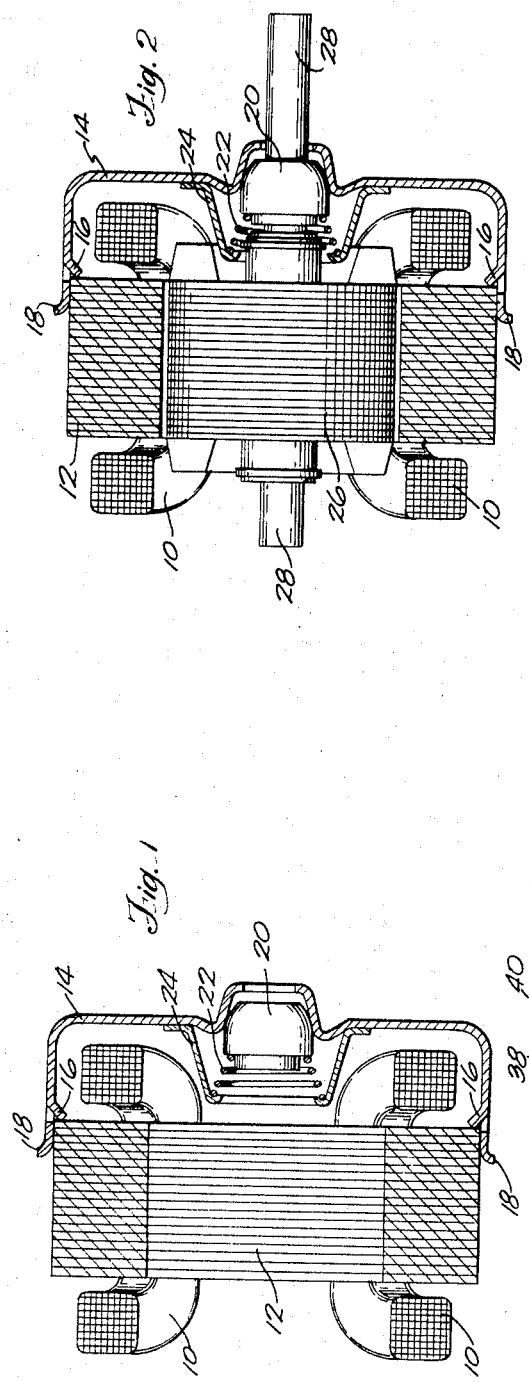
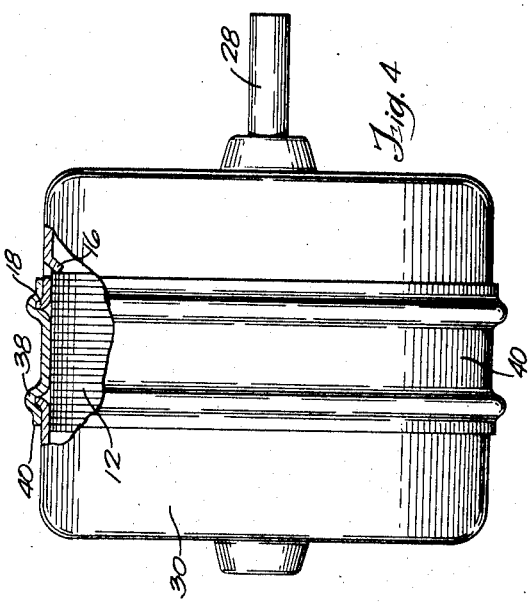
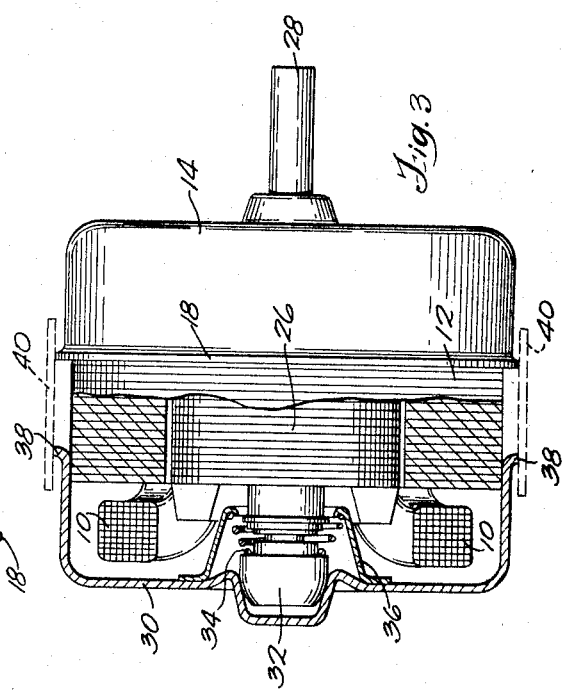
Inventor
Thomas W. Stone
By Joseph A. Genovese
Attorney United States Patent Office 3,433,990
Patented Mar. 18, 1969

3,433,990
ELECTRIC MOTOR AND HOUSING THEREFOR
Thomas W. Stone, Owosso, Mich., assignor to Controls Company of America, Melrose Park, Ill., a corporation of Delaware
Original application Jan. 29, 1965, Ser. No. 429,002. Divided and this application July 5, 1968, Ser. No. 742,937
U.S. Cl. 310—258
Int. Cl. H02k 1/12
6 Claims

ABSTRACT OF THE DISCLOSURE

A motor stator extends between and is engaged in the open ends of two motor end bells. The facing ends of the end bells are flanged and a strip extends around the motor between and in overlying relationship with the flanged ends. The strip is deformed around the flanges and into engagement with the stator. Prior to deforming, one of the end bells is freely movable on the stator to adjust the end play of the rotor supported by the end bells.

---

This is a division of application Ser. No. 429,002 filed on Jan. 29, 1965, entitled Electric Motor and Method of Making Same.

This invention relates to electric motors and fabrication thereof. More particularly, this invention is directed to a construction which lends itself to automated assembly and reduction of the number or variety of parts required in inventory.

The principal object of this invention is the simplification of construction of electric motors to thereby reduce the cost.

In carrying out this object I provide two standardized end bells which may be used for a variety of motors having a common diameter—i.e. the length of the motor varies with the motor size or power rating. These end bells are assembled on the core and will be spaced by a dimension determined by the axial length of the core. A flat strip is then wrapped around the motor to overlie peripheral flanges provided on the end bells and the strip is then formed or crimped, by any of a variety of known processes, to firmly engage the end bells and the core. Thus the end bells are standardized and the only variable is the width of the strip.

Other objects and advantages will be pointed out in, or be apparent from, the specification and claims, as will obvious modifications of the single embodiment shown in the drawings, in which:

FIG. 1 is a vertical section showing the stator core assembled into one end bell;

FIG. 2 shows the next step with the rotor in place;

FIG. 3 shows the other end bell in place and the strip is shown in dotted lines; and FIG. 4 shows the finished assembly after the strip has been formed.

In FIG. 1 the stator winding 10 and laminated core 12 are shown assembled into end bell 14 with the laminated core resting against lanced stops 16. The natural or normal cutoff 18 functions as a flange and is not trimmed off as usual. Normally the end bell drawing process requires squaring the left end of the bell 14. Any out-of-square is unimportant in this process and the flange is actually used to advantage. The lanced stops 16 can be accurately located and they serve to locate the core. The bearing 20 is held in position by spring 22 compressed between the bearing and the spring cup 24.

In the next step (FIG. 2) the rotor assembly 26 including shaft 28 is assembled into the bearing 20. Then (in FIG. 3) the left end bell 30 with its associated bearing 32, held in place by spring 34 seated against cup 36, is assembled over the core. The left end bell or case is pushed towards the right to its full limit indicating all end play is out of the assembly. Then the left case is backed off by the amount of desired end play. This is easily done automatically. This then insures precise control over end play. The cases 14 and 30 should not abut even when all end play is taken out of the assembly, the reason being that no effort has been made to hold the facing ends of the cases 14 and 30 true. The cutoff flange 38 is left on case 30. At this point in the assembly the two end cases are spaced apart.

The next step is to encircle the assembly with a "key strip" 40 which spans both flanges generously (dotted lines in FIG. 3). This strip is then formed by any desired method (magnetic, mechanical, or hydraulic) to form or crimp the strip tightly against the cases, over the flanges, and against the core as seen in FIG. 4.

I prefer to use conductive strip stock of the desired width in making the key strip. The strip stock can be cut off to the desired length and then wrapped around the assembly as in FIG. 3. There is no waste. Since the strip is not continuous when wrapped around the assembly there is not a continuous electrical path (or ring) so magnetic forming cannot be used in this situation. If magnetic forming is to be used then continuous rings must be used for the key strip. This requires a more expensive key strip, more difficult storage and handling and is less compatible with automated processing.

The final product according to this invention gains in precision while affording a more desirable construction. Many precise operations (on the end bells particularly) are eliminated. Standard end bells or cases can be used with the width of the strip changed to accommodate changes in design—i.e., various stack increments, non-symmetrical designs in which one end case has more room than the other, allowing more room for lead tying or end turn build up. No through bolts with the attendant space and noise problems are required.

If it is desired to seal the motor the abutting ends of the strip can be given a stove-pipe crimp. A single size of coil stock can be inventoried by having the width of the stock equal to the circumferential measure of the motor. The strip is then cut to the desired width of the strip (width of the strip being the axial measure).

Although but a single embodiment of the present invention has been illustrated and described, it will be apparent to those skilled in the art that various changes and modifications may be made therein without departing from the spirit of the invention or from the scope of the appended claims.

I claim:
1. An electric motor including a stator, axially spaced end bells on said stator, a circumferential strip extending around said motor and overlying a portion of each of said end bells, and means defining projections and generally complementary projection receiving portions on said end bells and strip, said projections engaged in said re- ceiving portions and connecting said strip to said end bells.

2. A motor according to claim 1 in which each of said end bells have open ends facing each other, said open ends being flanged and said strip including spaced indentations positioned over said flanges to form the connection between said end bells.

3. A motor according to claim 1 in which said end bells engage said stator.

4. A motor according to claim 1 in which one end bell has a stop on the interior thereof, said stator abutting the stop.

5. A motor according to claim 2 in which said end bells engage said stator.

6. A motor according to claim 5 in which one end bell has a stop on the interior thereof, said stator abutting the stop.

References Cited
UNITED STATES PATENTS

| | | | |
|---|---|---|---|
| 2,417,195 | 3/1947 | Hargreaves | 310—258 |
| 2,523,520 | 9/1950 | Reinhard | 310—258 |

WARREN E. RAY, *Primary Examiner.*

U.S. Cl. X.R.

310—42